United States Patent [19]

Alexander et al.

[11] Patent Number: 4,819,983
[45] Date of Patent: Apr. 11, 1989

[54] POWER LATCH SYSTEM

[75] Inventors: Michael P. Alexander, Grosse Ile; Allan J. Adams, Lincoln Park, both of Mich.

[73] Assignee: ASC Incorporated, Southgate, Mich.

[21] Appl. No.: 100,529

[22] Filed: Sep. 24, 1987

[51] Int. Cl.⁴ .......................... B60J 7/12; B60J 7/185
[52] U.S. Cl. ...................... 296/121; 276/76; 292/341.16; 292/DIG. 5; 411/433
[58] Field of Search ............ 296/76, 107, 120 R, 296/120 A, 121, 124, 128, 136; 292/256.65, 341.16, 341.15, 302, DIG. 5, DIG. 43; 411/433, 512

[56] References Cited

U.S. PATENT DOCUMENTS

| | | | |
|---|---|---|---|
| 2,741,503 | 4/1956 | Thompson, III | 296/120 A |
| 2,753,202 | 7/1956 | Smith et al. | 296/120 A |
| 3,081,078 | 3/1963 | Lohr | 296/76 X |
| 3,393,598 | 7/1968 | Bettinger | 411/433 |
| 4,048,897 | 9/1977 | Price, Jr. | 411/433 |

FOREIGN PATENT DOCUMENTS

| | | | |
|---|---|---|---|
| 1429628 | 5/1969 | Fed. Rep. of Germany | 411/433 |
| 27457 | 8/1981 | Japan | 292/341.16 |
| 736008 | 8/1955 | United Kingdom | 411/433 |

Primary Examiner—Dennis H. Pedder
Attorney, Agent, or Firm—Arnold S. Weintraub; William D. Blackman

[57] ABSTRACT

A powered latching mechanism includes a threaded pin which engages an opposed pair of rotating dogs maintained within a keeper assembly driven by an electric motor connected to the header of the windshield. The dogs are configured to have a ramped portion which permits the manual urging of the pin therepast in the event of failure of the electric motor and/or the hydraulics of the convertible top.

13 Claims, 3 Drawing Sheets

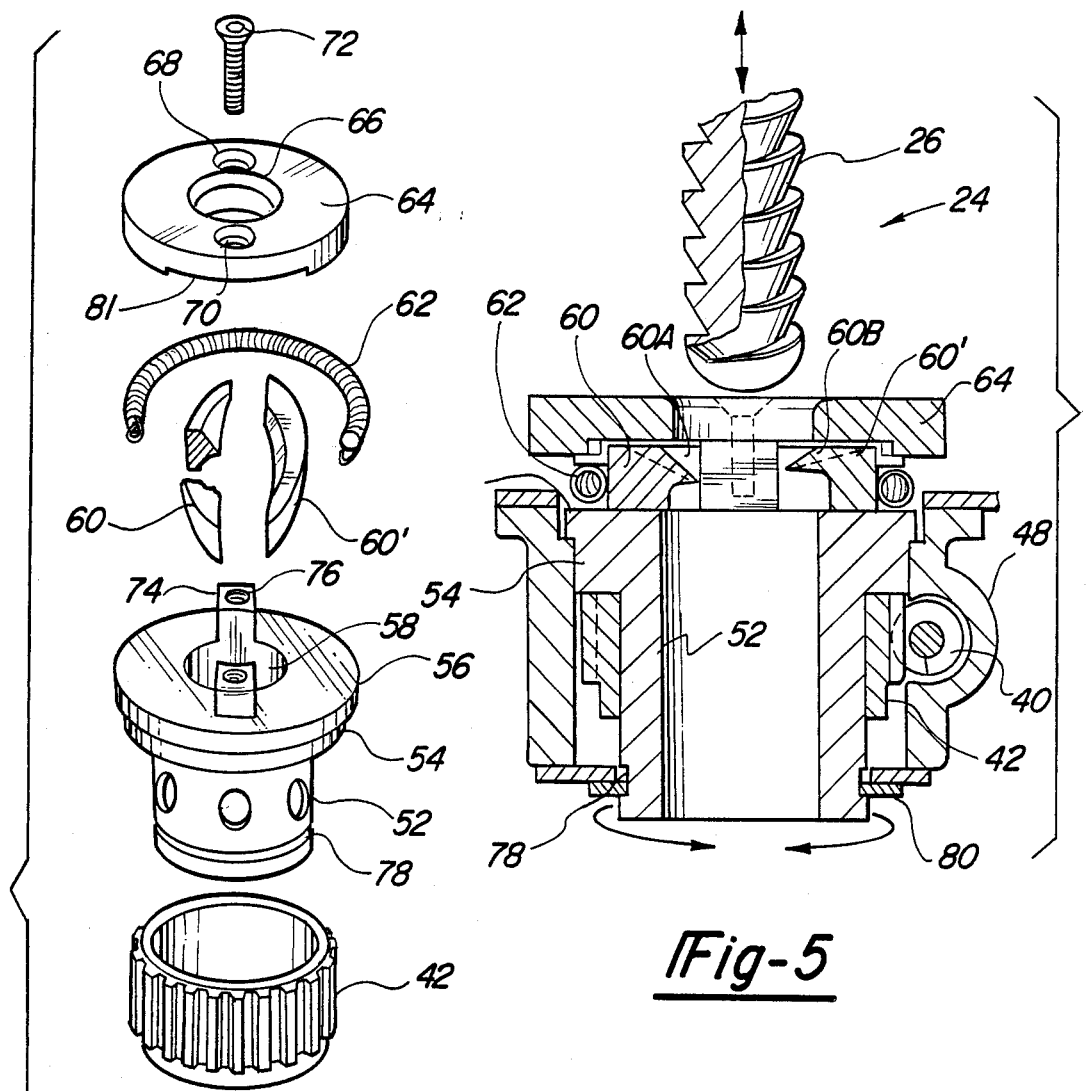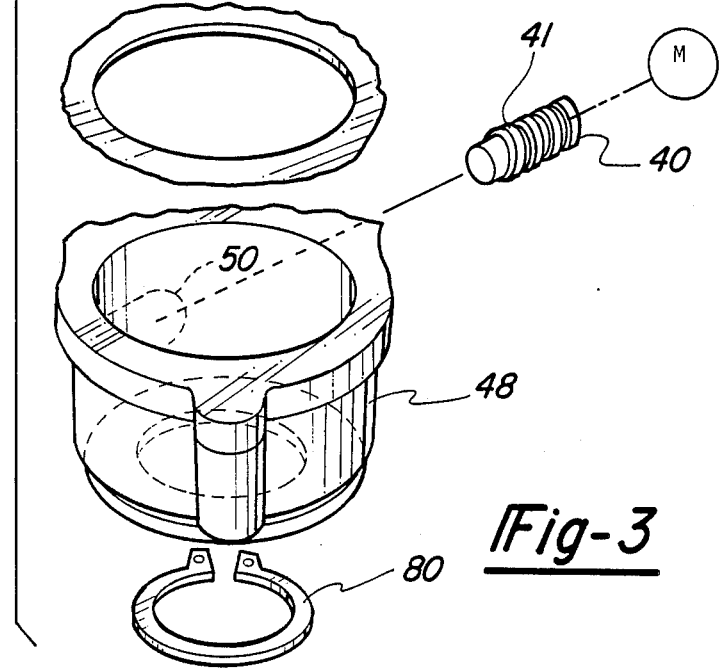

4,819,983

POWER LATCH SYSTEM

BACKGROUND OF THE INVENTION

1. Field of the Invention

The present invention concerns automotive latching systems. More particularly, the present invention concerns powered latching systems. Even more particularly, the present invention concerns powered latching systems for convertible tops, trunk lids, tonneau covers and the like.

2. Prior Art

Heretofore, there has been proposed, powered latch systems for convertible tops and the like for use in automotive applications. However, in prior art systems there was a tendency for the latching pins to be cross-threaded, to bind up and to otherwise render such power systems unusable necessitating expensive repair. Moreover, such prior art systems had no ability to catch on the latch without first energizing the motor.

Moreover, such prior art systems required alignment of the pin with the latching mechanism to relatively close precision, lest the system be rendered inoperative. Furthermore, if the power supply failed, in such prior art systems, it was virtually impossible to manually latch the convertible top to the automotive body.

It is to be appreciated that in modern automotive technology and with the increasing popularity of convertible tops that such prior art systems have deficiencies which render such convertible automobiles less than desirable.

In the present day market both male and female purchasers are attracted to the acquisition of such vehicles. Without a powered latch system which overcomes the problems encountered in the prior art the attractiveness of such vehicles, especially to the female purchaser, is somewhat detracted.

As will subsequently be detailed, the present invention provides a power latching system which overcomes the deficiencies in the power art.

SUMMARY OF THE INVENTION

In accordance with the present invention there is provided a power latch system which includes a rotatable cylinder operatively connected to the a means, such as an electric motor for rotating the cylinder, a pair of opposed clogs or dogs which are disposed within the cylinder and which are substantially horizontally stationarily mounted therein, and a pin engageable by the dogs, which threadingly interconnects to the cylinder upon the rotation thereof when the pin contacts the clogs.

In accordance herewith, the clogs are substantially opposed ramp surfaces having a specific configuration. The clogs are configured such that they can engage the pin in both a vertical and skewed orientation. This permits the motor to threadingly engage and latch down the pin even if it does not approach the cylinder in a precise vertical orientation, thereby overcoming any tendency to jam or the like.

The pin, likewise, has a specific thread configuration which, in cooperation with the ramp configuration, permits both vertical and skewed alignment for threading interengagement. Likewise, the pitch of the pin is such that upon failure of the motor to rotate the cylinder, the pin can be manually urged past the clogs to permit manual latching.

For a more complete understanding of the present invention reference is made to the following detailed description and accompanying drawing. In the drawing like reference characters refer to like parts throughout the several views in which:

BRIEF DESCRIPTION OF THE DRAWING

FIG. 3 is an exploded, perspective view of the latching or keeper assembly hereof;

FIG. 5 is an exploded, cross-sectional view taken along 5—5 of FIG. 4;

DESCRIPTION OF THE PREFERRED EMBODIMENT

At the outset, it is to be noted that although the present invention will be described with reference to a convertible top for a vehicle, the present invention evidences other utility wherever a powered pull down latching arrangement is desired. For example, in an automobile environment, in addition to latching convertible tops, the present invention is useful in latching powered trunk lids, deck lids and the like. Likewise, the latching assembly hereof can be used to tie down the rearwardmost bow in a convertible-type vehicle.

Figure 1:
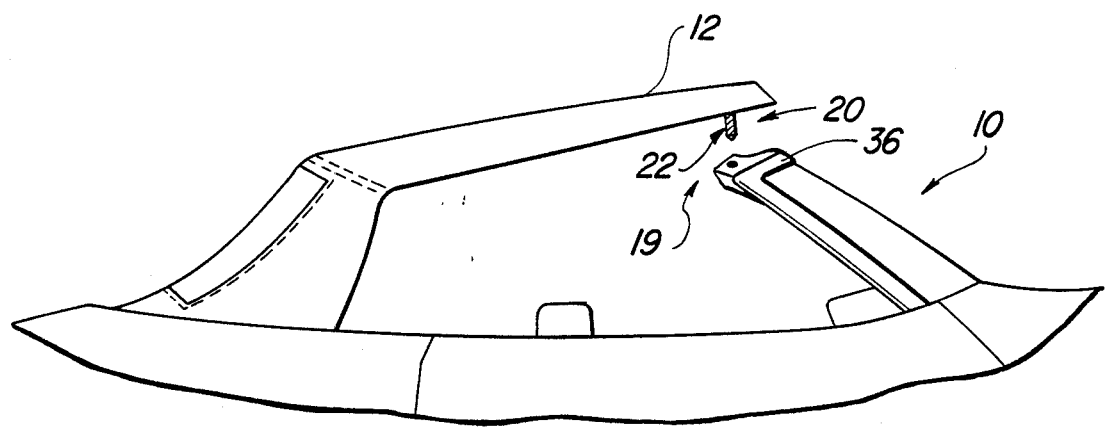
FIG. 1 is a partial, side elevational view of a convertible-type vehicle incorporating the power latch system hereof.
Figure 2:
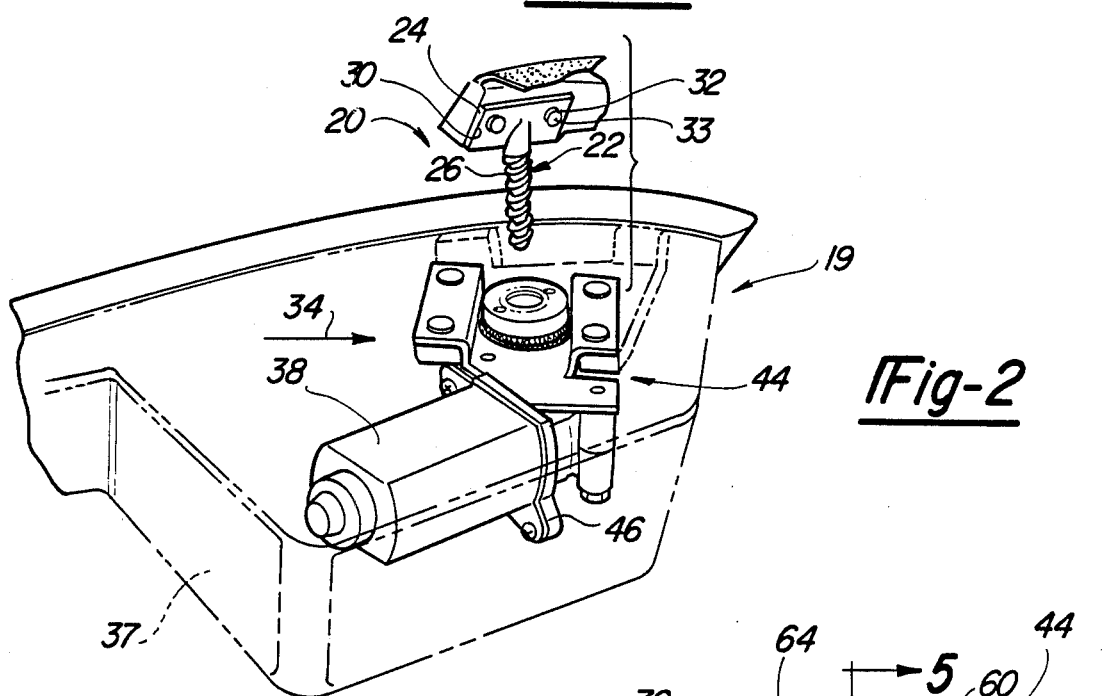
FIG. 2 is a partial, exploded, perspective view, of the power latch system hereof.
Figure 4:
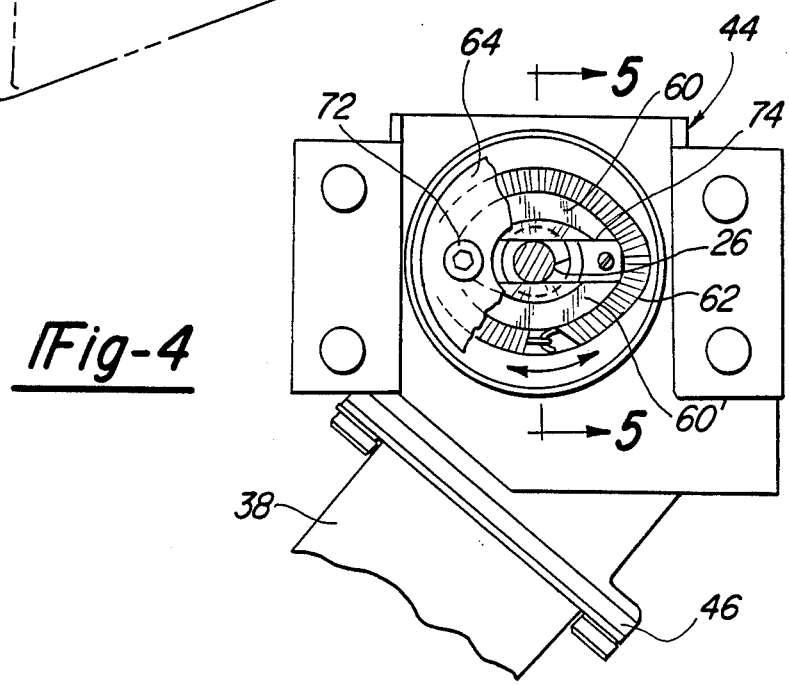
FIG. 4 is a top plan view, partly in section, of the latching assembly hereof.
Figure 6:
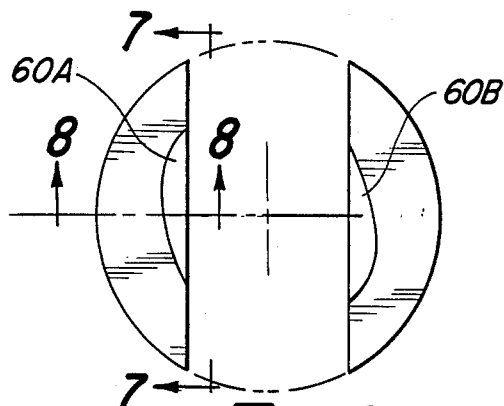
FIG. 6 is a top plan view of the dogs used in the practice of the present invention.

Referring now to the drawing, and in particular, FIG. 1, there is depicted therein an automobile 10 having a convertible or foldable top 12. As is known to those skilled in the art to which the present invention pertains, such convertible or foldable tops, generally, comprise a fabric covering secured to a plurality of bows or struts which traverse the width of the vehicle and are foldable rearwardly and forwardly through a plurality of linkages which interconnect the various bows or struts which carry the fabric. The actual constrution of the convertible top and the linkage system for the folding and unfolding thereof does not form part of the present invention, per se.

Referring again to the drawing, and in particular, FIGS. 1, 2, 5 and 9 there is depicted therein a power latch assembly in accordance with the present invention and, generally, denoted at 19. The power latch assembly includes a pin member or latch pin, generally, denoted at 20. The latch pin comprises a shank portion 22 and a mounting bracket portion 24 integrally formed therewith.

The shank portion is a substantially cylindrical member 26 having an external, helical thread formed therearound. The helical thread is adapted to threadingly engage a keeper assembly 34, as detailed subsequently. In order to be efficacious within the concept of the present invention, the threaded portion of the shank 22 has a pitch ranging from about 45° to about 60° and has a diameter of about 0.48 to 0.52 inches.

The bracket 24 comprises a substantially planar member 30 having at least one slot 32 (a pair of which are shown) formed therein. In the embodiment shown in the drawing the bracket engages the header bow of the convertible top 12 and receives a threaded fastener 33 through the slot 32 and the fastener 33 threadingly interengages or fastens to the header bow to mount the latch pin 20 thereto. The slot permits adjustment or positioning of the latch pin for proper alignment in order to be threadingly engaged with the keeper assembly 34.

Referring now to FIGS. 2, 3, 4, 5 and 6, there is depicted therein the keeper assembly or keeper hereof, generally, denoted at 34. The keeper or latching assembly 34 is mounted to the windshield header 36 of the vehicle by any suitable mode. Ordinarily, a decorative housing 37 encompasses the keeper for aesthetic purposes only.

The latching assembly or keeper 34, generally, comprises a means for rotating such as an electric motor 38. The motor is a conventional 12 volt dc motor having a rotatable output shaft 40.

A worm gear 41 is formed externally on the output shaft of the motor and, as is subsequently detailed, cooperates with a ring gear 42 to cause horizontal rotation of an opposed pair of the latching members.

The electric motor is powered by the vehicle, per se, through electrical connection to the alternator or battery in a manner well known to those skilled in the art. A switch (not shown) is interposed the motor and the source of power thereof to render the motor operative.

Connected to the motor 38 is a housing assembly, generally denoted at 44 which contains or houses the latching members for the pin 20.

The housing 44 includes a mounting bracket 46 which threadably interconnects the housing 44 to the motor 38. The worm gear 41 projects outwardly from the motor and into the housing 44.

The housing 44 includes a substantially cylindrical member 48 having an open top and open bottom. An opening 50 is formed in the side wall of the member 48 and through the opening 50 the worm gear 41 projects.

Axially vertically mounted within the member 48 is a cylindrical open-interiored ring gear 42. The ring gear 42, as will subsequently be detailed, causes rotation of a pair of opposed clogs or dogs or latching members upon the causal rotation of the ring gear 42 by its engagement with the worm gear 41.

The ring gear 42 seats within the member 48 and is freely rotatable therewithin.

A hollow cylindrical barrel 52 has a reduced diameter portion which seats into the open interior of the ring gear 42 and is rotatable therewith. The barrel has an annular flange 54 which seats atop the ring gear and has a diameter substantially equal thereto. Superposed the flange 54 is an enlarged plate 56 which is integrally formed with the barrel 52 and the flange 54. The enlarged plate 56 has a central opening 58 which permits the pin 20 to project therethrough. The plate 56 acts as a seat for the latch members in a manner to be described subsequently and is also referred to as seat 56 herein.

Figure 7:
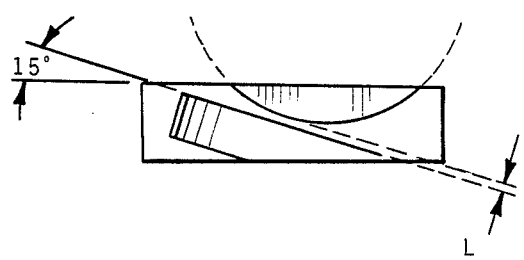
FIG. 7 is an end elevational view taken along line 7—7 of FIG. 6.
Figure 8:
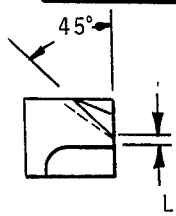
FIG. 8 is a cross-sectional view taken along line 8—8 of FIG. 6.
Figure 9:
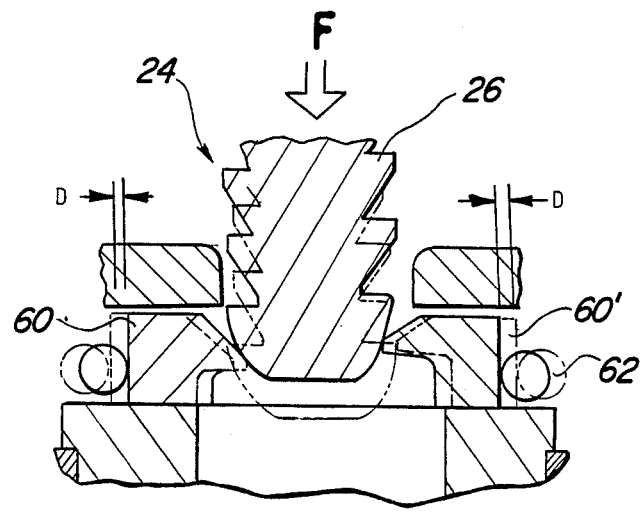
FIG. 9 is a cross-sectional view, partly in phantom, showing the engagement between the pin and dogs hereof.

Seated upon the plate 56 are the latching members defined by a pair of opposed ramped clogs or dogs 60, 60'. The ramped dogs 60, 60' have a inclination of about 15° and, at the innermost tip thereof, have an inclination of about 45°, as shown in FIGS. 7 and 8. Because of the configuration of the ramp portion of the dogs, the threaded shank 26 of the latch pin 20 cooperates to threadingly interengage therewith.

Likewise, because of the angle of inclination of the ramp portions 60a and 60b, the shank 26 can be manually passed thereby in order to manually latch the pin to the keeper assembly.

As shown in the drawing, a biasing member, such as a coiled spring 62 envelopes the opposed dogs and urges them toward the central aperture 58 into which the shank 26 projects upon latching.

A top plate 64 seats atop the opposed dogs and has a central opening 66 through which the shank 26 projects. A pair of opposed threaded apertures 68, 70 receive threaded fasteners 72 (only one of which is shown) to threadably interconnect the top plate 64 to the seat 56.

As shown in FIG. 3, the seat 56 has a flange 74 having a central threaded opening 76 which receives the threaded fastener 72. Thus, upon threaded interconnection of the top plate 64 to the seat 56 the dogs 60, 60' become housed therebetween. The height of the dogs is slightly less than the height between the upper surface of the seat 56 and the lower surface of the top plate 64 to permit some slight vertical movement therebetween. Furthermore, a recess is formed in the lower surface 81 of the top plate 64. The recess provides a positive lock for the dogs as follows. When the shank is held by the dogs the forces exerted thereby act against the spring and cause both an outward force as well as an upward force on the dogs. The upward force urges the dogs into the recess of the undersurface 81 to positively retain the dogs therein.

As clearly shown in FIG. 3, the barrel 52 has an annular groove 78 formed therearound at the bottom of the reduced diameter portion. A snap ring 80 fits in the groove to hold the barrel within the member 48 in order to define a unitary assembly.

In operation, the electric motor starts the rotation of the worm gear 41, which in turn, because of its meshing interengagement with the ring gear 42, causes rotation of the barrel and the dogs, so that the ring gear, barrel, and dogs rotate as a unit. The latch pin is brought into the entry opening or entryway 66 via suitable hydraulics associated with movement of the convertible top and upon further downward movement engages the rotating dogs. The vertical and lateral forces caused by the shank act against the termini of the ramps and exert a sufficient force to act against the spring 62 to urge the dogs out of the entryway and to threadably interengage the threaded portion of the shank. The inward biasing force of the spring 62 maintains the dogs in engagement with the threaded portion to positively lock the shank in the keeper assembly.

Reversal of the motor and reverse rotation of the assembly causes the pin to withdraw from the entryway 66.

Also, and as above noted, because of the geometry of the ramped portions of the dogs, in the event that the hydraulics should fail, the shank can be urged past the dogs and be positively engaged therewith for positive manual latching.

Having, thus, described the invention, what is claimed is:

1. A power latching mechanism comprising:
   (a) a threaded pin;
   (b) a keeper assembly which receives the pin, comprising:

(1) a pair of opposed dogs which engage the pin;
(2) means for biasing the dogs into engagement with the pin; and
(3) means for rotating the dogs to cause threadable engagement between the dogs and the pin.

2. The mechanism of claim 1 wherein the keeper assembly further comprises:
   (a) a cylindrical member having a side wall;
   (b) a rotatable ring gear seated within the cylindrical member;
   (c) a barrel having a seat for seating the dogs thereon, the barrel having a central opening therein and a reduced diameter portion which seats within the ring gear and which is rotatable therewith, the means for rotating causing the ring gear, the barrel, and the dogs to rotate as a unit; and
   (d) a top plate interconnected to the barrel, the dogs disposed between the top plate and the barrel.

3. The mechanism of claim 2, wherein:
   (a) the cylindrical member has an opening formed in the side wall;
   (b) the means for rotating the dogs comprises:
   (1) a rotatable output shaft extending from a reversible electric motor and having a worm gear formed thereon, the worm gear projecting into the side wall of the cylindrical member and engaging the ring gear to cause rotation thereof.

4. The mechanism of claim 1 wherein:
each dog has a substantially longitudinal ramp portion having an edge disposed inwardly at a 45° angle, each ramp having a substantially 15° incline.

5. The mechanism of claim 4 wherein:
the pin threads have a pitch in the range of about 45° to about 60° and the pin has a diameter in the range of about 0.48 inches to about 0.52 inches.

6. The mechanism of claim 5 wherein:
the biasing means exerts a force sufficient to urge the dogs into engagement with the pin while permitting the pin to be manually urged past the dogs.

7. In a convertible top-type vehicle, a power latch mechanism therefor, including:
   (a) a threaded pin mounted to a bow of the convertible top; and
   (b) a keeper assembly mounted to the vehicle body, the keeper assembly comprising:
   (1) a pair of opposed dogs which engage the pin;
   (2) means for biasing the dogs into engagement with the pin; and
   (3) means for rotating the dog to cause threadable engagement between the dog and the pin.

8. The mechanism of claim 7 wherein the keeper assembly further comprises:
   (a) a cylindrical member having a side wall;
   (b) a rotatable ring gear seated within the cylindrical member;
   (c) a barrel having a seat for seating the dogs thereon, the barrel having a central opening therein and a reduced diameter portion which seats within the ring gear and which is rotatable therewith, the means for rotating causing the ring gear, the barrel, and the dogs to rotate as a unit; and
   (d) a top plate interconnected to the barrel, the dogs disposed between the top plate and the barrel.

9. The mechanism of claim 8 wherein:
   (a) the cylindrical member has an opening formed in the side wall;
   (b) the means for rotating comprises:
   a rotatable output shaft connected to a reversible electric motor having a worm gear formed thereon, the worm gear projecting into the side wall of the cylindrical member and engaging the ring gear to cause rotation thereof.

10. The mechanism of claim 7 wherein:
each dog has a substantially longitudinal ramp portion having an edge disposed inwardly at a 45° angle, each ramp having a substantially 15° incline.

11. The mechanism of claim 10 wherein:
the pin threads have a pitch in the range of about 45° to about 60° and the pin has a diameter in the range of 0.48 inches to about 0.52 inches.

12. The mechanism of claim 11 wherein:
the biasing means exerts a force sufficient to urge the dogs into engagement with the pin while permitting the pin to be manually urged past the dogs.

13. The power latch system of claim 7 wherein:
   (a) the pin is carried on a forwardmost bow of the convertible top; and
   (b) the keeper assembly is mounted to the windshield header.

* * * * *